United States Patent [19]

Dodson et al.

[11] Patent Number: 4,722,586

[45] Date of Patent: Feb. 2, 1988

[54] ELECTRO-OPTICAL TRANSDUCER MODULE

[75] Inventors: Ronald K. Dodson, Beaverton; Raymond S. Enochs, Hillsboro; Randy S. Randall, Beaverton, all of Oreg.

[73] Assignee: Tektronix, Inc., Beaverton, Oreg.

[21] Appl. No.: 722,531

[22] Filed: Apr. 12, 1985

[51] Int. Cl.⁴ .................................................. G02B 6/36
[52] U.S. Cl. ................................... 350/96.20; 250/227
[58] Field of Search ............... 350/96.20, 96.21, 96.22; 250/227; 357/17, 19, 30, 74, 75, 80, 81

[56] References Cited

U.S. PATENT DOCUMENTS

| | | | |
|---|---|---|---|
| 4,237,474 | 12/1980 | Ladany | 350/96.20 |
| 4,268,114 | 5/1981 | d'Auria et al. | 350/96.20 |
| 4,302,071 | 11/1981 | Winzer | 350/96.20 |
| 4,307,934 | 12/1981 | Palmer | 350/96.20 |
| 4,413,881 | 11/1983 | Kovats | 350/96.20 |
| 4,431,261 | 2/1984 | Kozikowski | 350/96.20 |
| 4,479,698 | 10/1984 | Landis et al. | 350/96.20 |
| 4,500,165 | 2/1985 | Scholl et al. | 350/96.20 |
| 4,575,182 | 3/1986 | Hensel et al. | 350/96.21 |
| 4,591,711 | 5/1986 | Taumberger | 350/96.20 |

FOREIGN PATENT DOCUMENTS

| | | |
|---|---|---|
| 111263 | 6/1984 | European Pat. Off. |
| 2002140 | 2/1979 | United Kingdom |
| 2093631 | 9/1982 | United Kingdom ............. 350/96.20 |
| 2124402 | 2/1984 | United Kingdom |
| 2126795 | 3/1984 | United Kingdom |

Primary Examiner—William L. Sikes
Assistant Examiner—Frank Gonzáles
Attorney, Agent, or Firm—William S. Lovell; John D. Winkelman; John Smith-Hill

[57] ABSTRACT

An electro-optical transducer module comprises a base member having a generally flat surface and a platform upstanding from the flat surface, an electro-optical transducer mounted on the platform, a fiber mount plate secured to the base member with one main face in confronting relationship with the generally flat surface of the base member, and an optical fiber secured to the fiber mount plate by way of its other main face. The optical fiber has an end face that is in optically-coupled relationship with the electro-optical transducer.

14 Claims, 9 Drawing Figures

ELECTRO-OPTICAL TRANSDUCER MODULE

This invention relates to an electro-optical transducer module, and a method of manufacturing an electro-optical transducer module.

BACKGROUND OF THE INVENTION

With the advent of relatively inexpensive laser diodes, and of the ability to manufacture optical fibers, both single mode and multimode, having essentially uniform characteristics over virtually indefinite lengths, the use of optical fibers to transmit information, in the form of a modulated light beam launched into the fiber from a laser diode, has become common. For example, fiber optic telephone systems have progressed beyond the experimental stage, and it is also known to use optical fibers for transmission of video signals. The laser diode that is used for launching the light beam into the optical fiber must be in optically-coupled relationship with the proximal end face of the optical fiber. Optimum optical coupling requires that the end face of the fiber be positioned accurately relative to the light-emitting region of the laser diode, but this is difficult because of the small dimensions involved. Typically, the light-emitting region of a multimode laser diode is 0.5–1 $\mu$m by 10–15 $\mu$m, and the core of a multimode fiber is about 50–100 $\mu$m in diameter. These problems are even more serious in the case of a single mode fiber, where the diameter of the core is about one-fifth to one-tenth of that of a multimode fiber and the light-emitting region of the diode is about 0.5 $\mu$m by 2 $\mu$m, yet single mode fibers are being used increasingly owing to their reduced dispersion and consequent reduced signal degradation. Moreover, it is not only necessary that the fiber be accurately aligned with the light-emitting region of the diode with respect to directions transverse to the longitudinal axis of the fiber (x and y axis positioning) but also that the distance between the proximal end face of the fiber and the diode be accurately controlled (z axis positioning) in order that the maximum amount of light emitted by the diode be coupled into the fiber. It is also desirable that the diode be mounted in a hermetically sealed enclosure, in order to minimize contact with materials that might adversely affect the operation of the diode.

It is known to mount a laser diode inside a conventional TO5 package provided with a transparent window. In this manner, the diode is adequately protected from external influences. In order to maximize the amount of light that is emitted through the transparent window, a sapphire ball is also mounted inside the package, with the light-emitting region of the diode at the focal point of the ball. Thus, a collimated beam of light is generated, the diode and the sapphire ball being so positioned that this collimated beam is directed out of the package through the transparent window. The collimated beam is focused by a second sapphire ball, outside the package, on the end face of the core of an optical fiber. This type of packaging requires alignment of three elements relative to the diode, i.e. the two sapphire balls and the fiber, and consequently fabrication of the package is time-consuming, labor-intensive and expensive.

SUMMARY OF THE INVENTION

In accordance with the present invention, an electro-optical transducer module comprises a base member having a generally flat surface and a platform upstanding from the flat surface, an electro-optical transducer mounted on the platform, a fiber mount plate secured to the base member with one main face in confronting relationship with the generally flat surface of the base member, and an optical fiber secured to the fiber mount plate by way of its other main face. The optical fiber has an end face that is in optically-coupled relationship with the electro-optical transducer.

In a preferred implementation of the invention, the base member has a wall that partially surrounds the generally flat surface and extends above the transducer, and a cover member is sealed to the top end of the wall of the base member. The cover member has a fiber seal orifice through which the fiber extends, and this orifice is itself sealed. Thus, the transducer is mounted in a hermetically sealed enclosure and is protected from contact with materials that might adversely affect its performance.

It is also preferred that the end face of the fiber be conically or convexly lensed.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
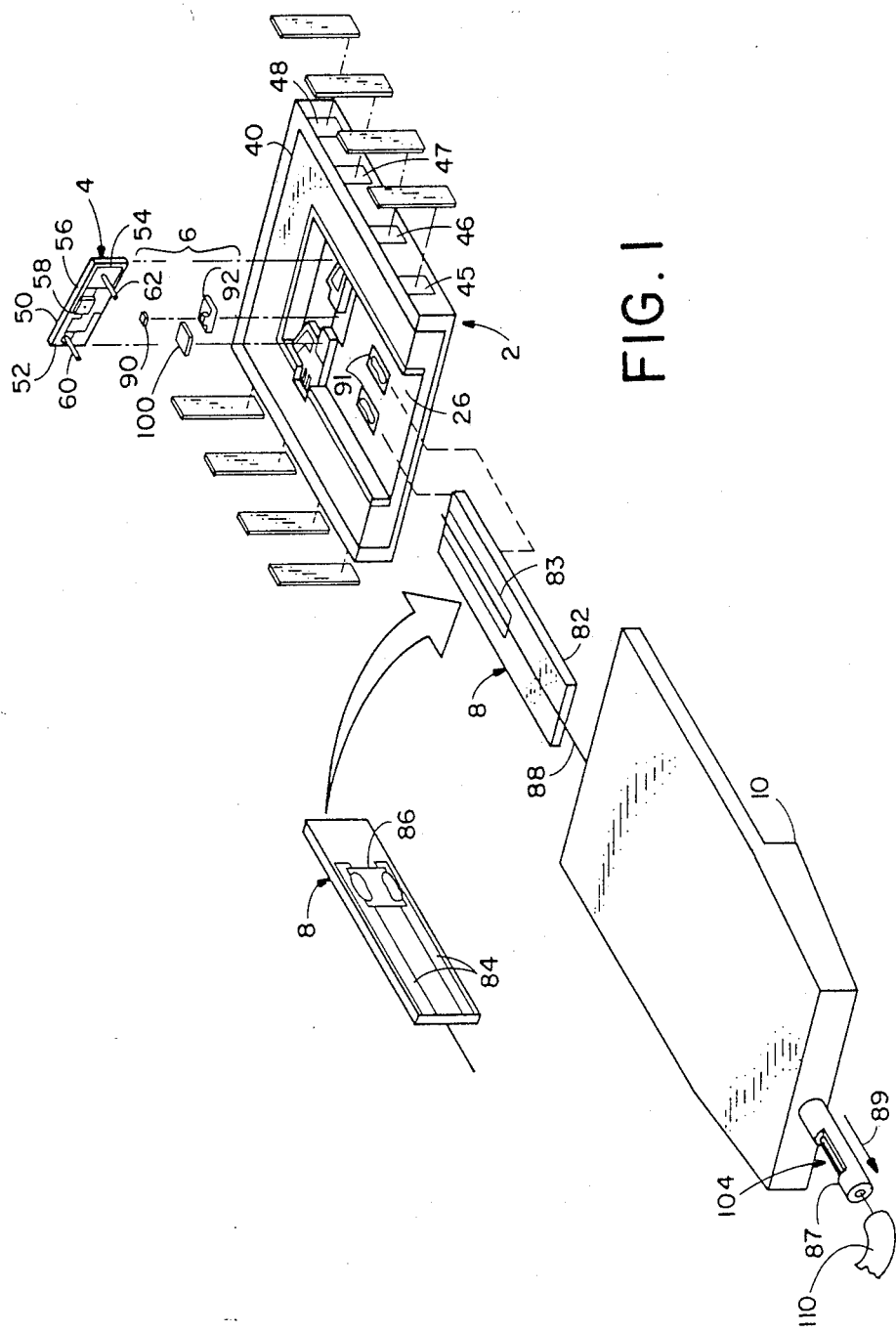
FIG. 1 is an exploded view of a laser diode module embodying the present invention.
Figure 2A:
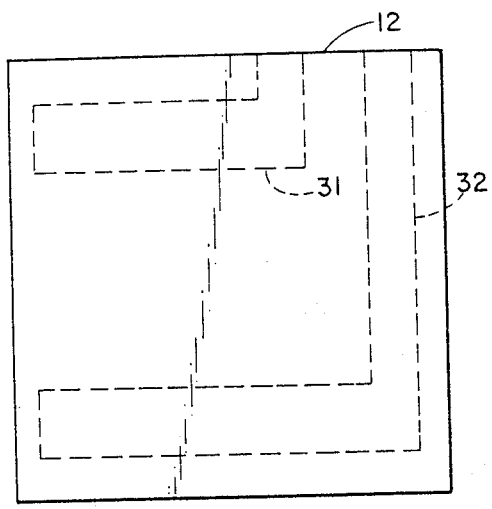
FIGS. 2(a)–(d) shows top plan views of the elements of a component of the laser diode module.
Figure 2B:
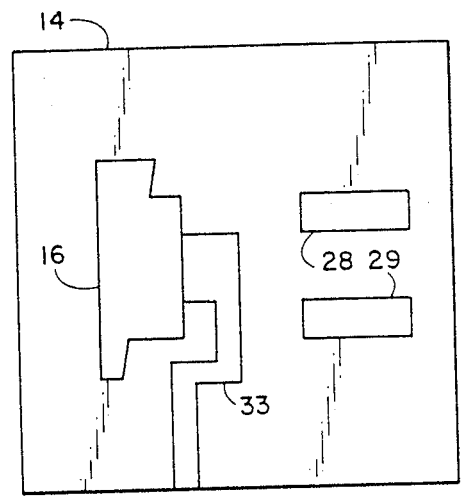
Figure 2C:
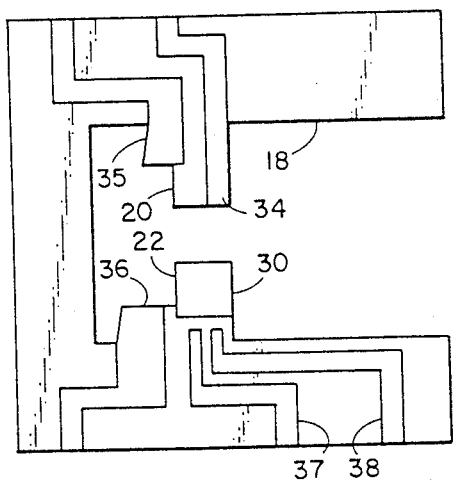
Figure 2D:
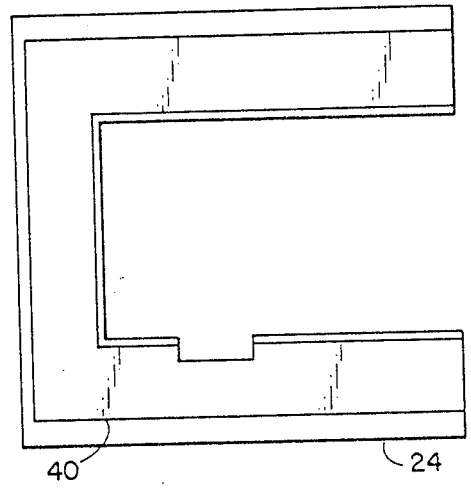
Figure 3:
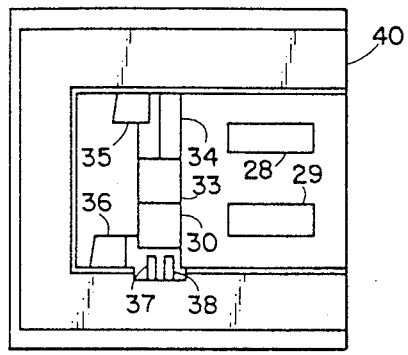
FIG. 3 is a top plan view of the component shown in FIG. 2, when assembled.
Figure 4:
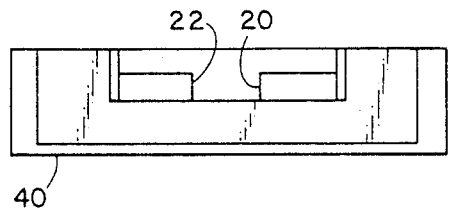
FIG. 4 is a side view of the component shown in FIG. 2.

The illustrated laser diode module comprises five main components namely a module body 2, a monitor diode assembly 4, a laser diode assembly 6, a fiber mount 8 and a cover 10. The module body defines a recess 26 that contains the monitor diode assembly and the laser diode assembly when the module is assembled. The module body is formed from four layers of tape ceramic. The bottom layer 12, shown in FIG. 2(a), is a continuous layer. On top of the layer 12 is a layer 14 that defines a pocket 16 for receiving the monitor diode assembly. The pocket is closed at the bottom by the layer 12. On top of the layer 14 is a layer 18 that forms the first tier of a wall partially surrounding the recess 26 and also has promontories 20 and 22. Finally, the layer 24 provides the top tier of the wall surrounding the recess 26. The layer 12 is metallized over its bottom surface in two discrete areas forming contact runs 31 and 32, while the layer 14 is metallized over its upper surface in three discrete areas forming bonding areas 28 and 29 and a contact run 33, and the layer 18 is metallized over its upper surface in six discrete areas forming a bonding area 30 and contact runs 34–38. The four layers are fitted together as shown in FIGS. 3 and 4, and are then secured together by a conventional process in which the several layers become sintered together, resulting in air-tight seals between the layers. Thereafter, the completed module body is metallized over the peripheral area 40 (FIG. 1) and over terminal areas 41-48 that provide contact with the metallized contact runs 31-38.

The metallization is performed in a known manner, by electrolytic deposition. Using this technique it may be desirable for all the metallized areas on a given ceramic layer to be parts of a single continuous metallized area that is subsequently patterned to define the desired discrete areas. However, this method of providing discrete metallized areas is entirely conventional.

When the module body has been assembled, leads are connected to the terminal areas 41-48 by brazing. At the same time, a diode mount 92, forming part of the laser diode assembly 6, is brazed to the contact run 33 which, it will be appreciated, extends into the gap defined between the promontories 20 and 22. In addition to the diode mount 92, the diode assembly comprises the laser diode itself, denoted 90.

The laser diode assembly 6 is assembled in situ, but the monitor diode assembly 4 must be assembled prior to installation in the recess 26, and the fiber must be secured to the fiber mount 8 prior to installation of the fiber mount in the recess 26. The monitor diode assembly 4 comprises a ceramic substrate 50 that is metallized in two contact areas 52 and 54, and a photodiode 56. Depending upon the wavelength of the light emitted by the laser diode, the photodiode 56 may be made of germanium, silicon, gallium arsenide or some other material. It is preferred that the contact area 54 include a mounting portion (not shown) to enable mounting of the photodiode to the substrate 50 by eutectic die attachment.

The diode 56 has one terminal at its top face and its other terminal at its bottom face. The diode 56 is attached to the substrate 50 by way of its bottom face, and the bottom face terminal of the diode is electrically connected through the eutectic alloy and the metallization of the substrate 50 to the contact area 54. An electrical connection to the top face terminal is established by wire bonding to the contact area 52, as shown at 58. The monitor diode assembly further comprises two connection pins 60 and 62 that are secured to the metallized areas 35 and 36 respectively by soldering.

The fiber is prepared for securement to the fiber mount 8 by first lensing the end face of the fiber in a known manner, and then metallizing its end region 88. The fiber is metallized using evaporative thin film techniques to deposit a layer of titanium followed by a layer of nickel and a layer of gold. The layer of titanium serves as an adhesive, in that it adheres well to the glass of a conventional optical fiber. The nickel serves as a solderable metal, and the gold serves to protect the nickel from oxidation.

The fiber mount 8 comprises an elongate ceramic substrate 82 having a central, longitudinal solderable metallization area 83 on its upper face and having two strip-form areas 84 of metallization along opposite respective margins of its lower face and a thick-film resistor 86 bridging the metallization areas. In order to secure the fiber to the substrate 82, the end region 88 of the fiber is placed on the upper surface of the substrate 82 so that it extends along the metallization area 83 and the lensed face of the fiber projects by about 4 mils (one mil is equal to 0.001 inch, or about 0.025 mm) beyond the end of the substrate 82. The fiber is secured into position on the substrate 82 by soldering to the metallization area 83. The heat for soldering may be applied by passing current through the thick film resistor 86 by way of the metallization areas 84 and thereby heating the substrate.

Figure 6:
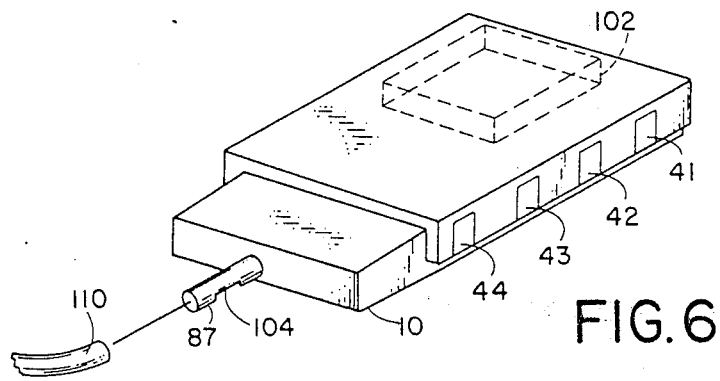
FIG. 6 is a perspective view of the assembled laser diode module, inverted with respect to FIG. 1.

Since the performance of conventional laser diodes is temperature dependent, it is necessary to regulate the temperature within the recess 26. This is accomplished using a temperature sensor 100 and a Peltier effect heat pump 102 (FIG. 6). The temperature sensor is secured to the module body 2 by eutectic die attachment to the metallized bonding area 30. Wire bonding is used to establish connections between the temperature sensor and the metallized areas 37 and 38. The attachment of the heat pump 102 to the module body takes place after the module body has been secured to the cover 10.

Figure 5:
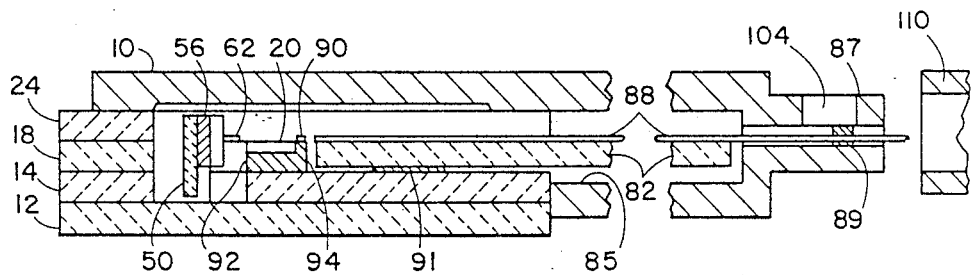
FIG. 5 is a longitudinal sectional view of the laser diode module.

After positioning the temperature sensor and establishing the connections between the temperature sensor and the metallized areas 37 and 38, the laser diode 90 is installed. It will be noted that the diode mount 92 forms a platform on top of the generally flat upper surface of the layer 14, and that the diode mount itself has a small upward projection 94 at its forward edge (the edge to the right of the diode mount as seen in FIG. 5). The diode 90 is placed on top of the projection 94 and the diode 90 is secured thereto by soldering. Subsequently, a gold ribbon (not shown) is positioned with one end on top of the diode 90 and with its other end contacting the metallized area 34, and the monitor diode assembly 4 is placed in the pocket at the rear of the promontories 20 and 22, with the pins 60 and 62 contacting the metallized areas 35 and 36 respectively, and metallurgical bonds are established by soldering between the gold ribbon 96 and both the diode 80 and the metallized area 34 and between the pins 60 and 62 and the metallized areas 35 and 36 respectively. The substrate 50 is positioned in the pocket 16 so that the light-receiving face of the photodiode 56 is inclined to the rear light-emitting face of the laser diode 90 in order to insure that light reflected from the photodiode 56 does not fall on the laser diode 90.

A small drop 91 of solder cream having a melting point lower than that of the solder used to attach the fiber to the metallization area 83 is placed on each of the metallized bonding areas 28 and 29, and the fiber mount 8 is then placed with its front end (the end from which the lensed end face of the fiber projects) within the recess 26 and with the end face of the fiber presented towards the diode 90. In this position, the solder cream on the metallized areas 28 and 29 also contacts the metallization areas 84. The solder cream is a viscous fluid that is plastically deformable but, in the quantity employed, does not readily flow under the influence of gravity only, and therefore remains in place between the resistor 86 and the bonding areas 28 and 29. The laser diode 90 is energized and the fiber mount is manipulated using a micromanipulator (not shown) until the light output at the distal end of the fiber indicates that the end face of the fiber is optically coupled to the light-emitting region of the diode. Current is passed through the resistor 86, elevating the temperature of the resistor sufficiently to melt the solder cream but not sufficiently to disturb the soldered connection between the substrate 82 and the fiber 88, and when the current flow is interrupted and the resistor has cooled, the solder creates a secure metallurgical bond between the substrate 82 and the layer 14 of the module body. A space of about 5 mils remains between the substrate 82 and the layer 14.

After the fiber mount 8 has been secured in position, the cover 10 is placed in position. The cover 10 is made of metal and defines a recess 85. In addition, the cover is formed with a tubular stub 87. The distal end of the fiber is threaded through the stub 87 in the direction of the arrow 89 and the cover is advanced along the fiber until the back end of the fiber mount is received in the recess 85 and the edges of the cover engage the metallized area 40. The cover is then soldered to the module body using a solder having a melting point lower than that of the solder cream. The stub 87 of the cover is soldered to the metallization on the end region of the fiber as shown at 104. Finally, a strain relief tube 110 is fitted over the fiber and is secured to the exterior of the stub 87, and the Peltier effect heat pump 102, which is shown only diagrammatically in the drawings, is secured to the underside of the layer 12 using an epoxy adhesive. The heat pump 102 has two terminals (not shown) that are soldered to the metallized contact runs 31 and 32.

The illustrated laser diode module, which is about 2.3 centimeters long and 1 centimeter wide, may be secured to a hybrid circuit substrate or an etched circuit board. For this purpose, the module is inverted, so that the cover is downwards and the Peltier effect heat pump is upwards, and the module is secured to the substrate or circuit board by way of its leads. The leads are shaped to facilitate attachment to the substrate or circuit board. For example, the leads may be straight, as shown in FIG. 1, or they may be L-shaped. In use, the leads that are connected through the terminal areas 35 and 36 to the monitor diode assembly are connected to a circuit (not shown), which may be of conventional design, for regulating the current supplied to the laser diode, and the leads that are connected through the terminal areas 37 and 38 to the temperature sensor are connected to a circuit (not shown), which also may be of conventional design, to regulate the Peltier heat pump so as to maintain the laser diode at a substantially constant temperature.

Using a conventional micromanipulator, the fiber mount 8, and consequently the end face of the fiber secured to the fiber mount, can be positioned relative to the light-emitting region of the laser diode 90 to within about 0.1 $\mu$m in all three linear directions (x, y and z). The range of operating temperatures that might exist within the chamber formed by the recesses 26 and 85, and the coefficients of thermal expansion of common materials, are such that thermal expansion of the diode mount 92 could change the height of the light-emitting region of the laser diode 90 relative to the optical axis of the proximal end face of the optical fiber to such an extent as to affect adversely the optical coupling between the diode 90 and the fiber. For this reason, the material of the diode mount 92 is chosen to have a coefficient of thermal expansion that matches that of the substrate 82 (for example, in the event that the substrate 82 is made from a high percentage $Al_2O_3$ ceramic body, the diode mount 92 may be a 90% tungsten, 10% copper alloy), and consequently alignment is maintained between the laser diode and the optical fiber under changes in temperature.

The laser diode module is manufactured without use of epoxy or other organic adhesives that are not suitable for forming a true hermetic seal. Through use of metallurgical bonds exclusively, a true hermetic enclosure is formed about the laser diode and the proximal end face of the optical fiber, and non-destructive removal of the fiber is permitted. It is particularly advantageous that such metallurgical bonds be used in securing both the laser diode and the optical fiber to the module body, because epoxy adhesives have relatively poor dimensional stability.

Solder glass may be used to secure the optical fiber to the substrate 82. Solder glass is a low melting point glass, and therefore the fiber is secured without using a metallurgical bond but nevertheless the disadvantages of organic adhesives, such as epoxy adhesives, are avoided. In accordance with this variation, the end region of the fiber that is to be secured to the substrate 82 is not metallized, and a powdered solder glass is used to attach the fiber to the metallization area 83. The end region of the fiber is brought into contact with the glass, and the glass is melted by heating the resistor 86. When the current is turned off, the solder glass solidifies and attaches the fiber securely to the substrate. It is, of course, still necessary to metallize the fiber where it is soldered into the stub 87. By mounting the optical fiber to the substrate 82 prior to alignment of the fiber with respect to the diode 90, manipulation of the fiber, and securement of the fiber to the module body 2, are facilitated. By integrating in this fashion both the means for positioning the fiber and the means for securing the fiber, it becomes unnecessary to manipulate the fiber directly and risk disturbing the positioning of the fiber when releasing the fiber prior to securing it.

It will be appreciated that the invention is not restricted to the particular method and device that have been described above, and that variations may be made therein without departing from the scope of the invention as defined in the appended claims, and equivalents thereof. For example, although the illustrated laser diode module has been fabricated without use of organic materials inside the interior chamber formed by the recesses 26 and 85 or for sealing the chamber, in applications where true hermeticity is not critical epoxy or other organic adhesives might be used. In addition, the invention may be applied to other electro-optical transducers than single mode laser diodes, such as multimode laser diodes, photodiodes and light emitting diodes. Moreover, although metallurgical bonds are used for positioning the diode 90 and the optical fiber because of the relatively poor dimensional stability of organic adhesives, in applications where the degree of optical coupling between the diode 90 and the optical fiber is not so critical, and variations with time can be tolerated, adhesive systems that are not exclusively metallurgical might be employed. For example, in the case of a multimode fiber, alignments and tolerances are not nearly so critical as in the case of a single mode fiber.

It is preferred that the proximal end face of the fiber be lensed, since this facilitates positioning of the fiber in its longitudinal direction. Thus, in the case of a lensed end face, the degree of coupling of the fiber to the diode increases as the end face is brought closer to the diode until the light-emitting region of the diode is at the focal point of the end face, and the degree of coupling then decreases, whereas in the case of a cleaved fiber the degree of coupling increases until the end face actually touches the diode. The turning point in the degree of coupling in the case of the lensed end face insures that contact between the end face of the fiber and the laser diode, which may cause damage to the fiber and/or the diode, can be avoided. Lensing of the fiber also reduces reflection from the end face of the fiber into the light emitting region of the laser diode. However, it is not essential to the invention that the fiber be lensed.

The various soldered and brazed joints that are established are formed using known techniques, involving, e.g., the use of solder preforms or creams. The solders that are successively used have progressively lower melting points, so that as each metallurgical bond is established, the temperature required to establish that bond is low enough that disturbing the previous bonds can be avoided. Various families of solders that have an appropriate hierarchy of melting points are commercially available, and the family that is used will depend upon the temperatures to which it is expected that the module will be exposed in use.

We claim:

1. An electro-optical transducer module comprising a base member having a generally flat surface and a platform upstanding from said flat surface, an electro-optical transducer mounted on said platform, a fiber mount plate having first and second main faces and secured to the base member with its first main face in confronting relationship with said generally flat surface, and an optical fiber secured to the fiber mount plate by way of the second main face thereof, the optical fiber having an end face in optically-coupled relationship with said electro-optical transducer, wherein said fiber mount plate is made of ceramic material and platform is made of a thermally-conductive material having a coefficient of expansion that substantaily matches that of said ceramic materal.

2. A module according to claim 1, wherein the optical fiber is glass bonded to the fiber mount 3. A module according to claim 1, wherein the base member has a wall that at least partially surrounds said generally flat surface, and wherein the module further comprises a cover that is secured to the base member in hermetically sealing fashion.

4. A module according to claim 1, wherein the electro-optical transducer is a laser diode having a front face directed towards the end face of the optical fiber and also having a back face, and wherein the module also comprises a photodiode positioned to receive light emitted from the laser diode by way of the back face thereof.

5. A method of assembling an electro-optical transducer module that comprises a base member having a generally flat surface and a platform upstanding from said flat surface, said method comprising mounting an electro-optical transducer on said platform, securing an optical fiber that has an end face to a first main face of a fiber mount plate that also has a second main face, and securing the fiber mount plate with its second main face in face-to-face contact with the generally flat surface of the base member and with the end face of the fiber in optically-coupled relationship with the electro-optical transducer.

6. A method according to claim 5, wherein the optical fiber is secured to the fiber mount plate by means of a solder having a first melting point and the fiber mount plate is subsequently secured to the base member by means of a solder having a second, lower melting point.

7. A method according to claim 5, wherein the fiber mount plate has a resistor at its second main face, and soldering of both the optical fiber to the fiber mount plate and the fiber mount plate to the base member is effected by heating the resistor.

8. A method according to claim 6, comprising subsequently securing a cover member to the base member by means of a solder having a third, still lower melting point.

9. A method according to claim 5, wherein the electro-optical transducer is mounted on said platform using a solder having a first melting point and the fiber mount plate is subsequently secured to the base member using a solder having a second, lower melting point.

10. An apparatus manufactured in accordance with the method of claim 5.

11. An apparatus manufactured in accordance with the method of claim 6.

12. An apparatus manufactured in accordance with the method of claim 7.

13. An apparatus manufactured in accordance with the method of claim 8.

14. An apparatus manufactured in accordance with the method of claim 9.

* * * * *